United States Patent
Barbour (10) Patent No.: US 11,212,456 B2
(45) Date of Patent: Dec. 28, 2021

(54) SYNCHRONIZED PROJECTION AND IMAGE CAPTURE

(71) Applicants: SONY GROUP CORPORATION, Tokyo (JP); SONY PICTURES ENTERTAINMENT INC., Culver City, CA (US)

(72) Inventor: Scot Barbour, Culver City, CA (US)

(73) Assignees: SONY GROUP CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 16/714,398

(22) Filed: Dec. 13, 2019

(65) Prior Publication Data

US 2020/0204720 A1   Jun. 25, 2020

Related U.S. Application Data

(60) Provisional application No. 62/784,232, filed on Dec. 21, 2018.

(51) Int. Cl.
*H04N 5/235* (2006.01)
*G06T 7/521* (2017.01)
*G06T 7/586* (2017.01)

(52) U.S. Cl.
CPC .......... *H04N 5/2354* (2013.01); *G06T 7/521* (2017.01); *G06T 7/586* (2017.01); *G06T 2207/10016* (2013.01); *G06T 2207/10048* (2013.01); *G06T 2207/30196* (2013.01)

(58) Field of Classification Search
CPC ... H04N 5/2353; H04N 5/332; G01B 11/2518
See application file for complete search history.

(56) References Cited

U.S. PATENT DOCUMENTS

| | | | |
|---|---|---|---|
| 8,553,103 B1 * | 10/2013 | Samadani | H04N 21/4223 348/223.1 |
| 9,407,837 B2 | 8/2016 | Lee | |
| 2009/0238449 A1 * | 9/2009 | Zhang | G06T 7/521 382/165 |

(Continued)

OTHER PUBLICATIONS

"Capturing Textured 3D Shapes based on Infrared One-shot Grid Pattern" —Kazuhiro Sakashita, Ryusuke Sagawa, Ryo Furukawa, Hiroshi Kawasaki, Yasushi Yagi; IPSJ Transactions on Computer Vision and Applications 4: 161-169 (2012) (Year: 2012).*

(Continued)

*Primary Examiner* — Mainul Hasan
(74) *Attorney, Agent, or Firm* — Procopio, Cory, Hargreaves & Savitch LLP (57) ABSTRACT

Image capturing, including: generating a pattern of light projection to be projected during non-video capture segments, wherein the pattern of light projection is not projected during video capture segments; determining timing of the non-video capture segments; projecting the generated pattern of light onto a capture volume during the non-video capture segments for a period less than a length of one non-video capture segment; capturing image data of the projected pattern of light using at least one image sensor; and processing the captured image data to obtain information about objects and people in the capture volume.

17 Claims, 5 Drawing Sheets

(56) References Cited

U.S. PATENT DOCUMENTS

| | | | |
|---|---|---|---|
| 2011/0249014 A1* | 10/2011 | Kolstad | H04N 5/332 345/589 |
| 2013/0002882 A1* | 1/2013 | Onozawa | H04N 9/04553 348/164 |
| 2013/0101176 A1* | 4/2013 | Park | H04N 5/2226 382/106 |
| 2013/0258112 A1* | 10/2013 | Baksht | H04N 5/33 348/164 |
| 2014/0240492 A1* | 8/2014 | Lee | G06K 9/2036 348/136 |
| 2015/0002734 A1 | 1/2015 | Lee | |
| 2015/0253428 A1* | 9/2015 | Holz | G01S 17/36 356/5.01 |
| 2015/0373322 A1* | 12/2015 | Goma | G01S 17/894 348/21 |
| 2016/0088275 A1* | 3/2016 | Fuchikami | G01B 11/2536 348/744 |
| 2017/0180654 A1 | 6/2017 | Swaminathan et al. | |
| 2017/0318238 A1* | 11/2017 | Sugiyama | H04N 9/04515 |
| 2018/0164156 A1* | 6/2018 | Price | G01J 3/0264 |
| 2018/0295296 A1* | 10/2018 | Huang | A61B 5/489 |

OTHER PUBLICATIONS

"Photometric and geometric measurements based on multi-primary image projector" —Keita Hirai; Daisuke Irie; Takahiko Horiuchi; 2015 Colour and Visual Computing Symposium (CVCS), DOI: 10.1109/CVCS.2015.7274879 (Year: 2015).*

\* cited by examiner

SYNCHRONIZED PROJECTION AND IMAGE CAPTURE

CROSS-REFERENCE TO RELATED APPLICATIONS

This application claims the benefits of priority under 35 U.S.C. § 119(e) of U.S. Provisional Patent Application No. 62/784,232, filed Dec. 21, 2018, entitled "Synchronized Projection and Image Capture." The disclosure of the above-referenced application is incorporated herein by reference.

BACKGROUND

Field

The present disclosure relates to image capture, and more specifically, to capturing image to enhance the quality of videos.

Background

In some videos, the difference between the capture rate of an image sensor and the amount of image data needed for a target video rate can be significant, and the difference may be wasted.

SUMMARY

The present disclosure provides for synchronized projection and image capture.

In one implementation, an image capture system is disclosed. The system includes: a plurality of light sources configured to illuminate a capture volume for at least one of video capture and non-video capture; at least one image sensor configured to capture image data; and a processor coupled to and configured to control operation of the least one image sensor and the plurality of light sources, wherein the plurality of light sources includes a plurality of primary light sources to illuminate the capture volume during segments of the video capture, wherein the plurality of light sources includes a plurality of pattern light sources configured to illuminate the capture volume with patterns during segments of the non-video capture.

In one implementation, the plurality of light sources which illuminates during segments of the video capture is configured to enable determination of at least one of color, texture, and lighting of objects and people in the capture volume. In one implementation, the plurality of light sources which illuminates during segments of the non-video capture is configured to enable determination of geometrical information of objects and people in the capture volume. In one implementation, the plurality of light sources which illuminates during segments of the non-video capture is configured to enable determination of information about the at least one sensor including changes in positions of the at least one sensor based on distortions of the patterns. In one implementation, the patterns illuminated by the plurality of pattern light sources include at least one of patterns of checkerboard, line, wave, dot, and known noise. In one implementation, the non-video capture includes: a secondary capture to enable determination of one of geometrical information of objects and people in the capture volume or calibration of the at least one sensor; and a tertiary capture to enable motion capture. In one implementation, the image data captured during the segments of the video capture is discarded or used as reference video, and only the image data captured during the segments of the non-video capture is used. In one implementation, the image data captured during the segments of the video capture is discarded, and only the image data captured during the segments of the non-video capture is used. In one implementation, the image data captured during the segments of the video capture is used as reference video, and the image data captured during the segments of the non-video capture is used to determine one of: geometrical information of objects and people in the capture volume; or calibration of the at least one sensor. In one implementation, the plurality of light sources which illuminates during the segments of the video capture and the non-video capture is configured to enable determination of information about the at least one sensor including changes in positions of the at least one sensor based on distortions of the patterns. In one implementation, the at least one image sensor includes: a first plurality of sensors to perform the video capture; and a second plurality of sensors to perform the non-video capture, wherein the second plurality of sensors includes infrared sensors. In one implementation, the infrared sensors are used for motion capture. In one implementation, the at least one image sensor includes at least one camera system used for one of: entertainment content, movies, television, personal games, security video, or medical imaging.

In another implementation, a method for capturing image data is disclosed. The method includes: generating a pattern of light projection to be projected during non-video capture segments, wherein the pattern of light projection is not projected during video capture segments; determining timing of the non-video capture segments; projecting the generated pattern of light onto a capture volume during the non-video capture segments for a period less than a length of one non-video capture segment; capturing image data of the projected pattern of light using at least one image sensor; and processing the captured image data to obtain information about objects and people in the capture volume.

In one implementation, the information about the objects and people includes geometrical information of the objects and people. In one implementation, the information about the objects and people includes changes in positions of the at least one sensor based on distortions of the projected pattern of light. In one implementation, the pattern of light projection comprises at least one of patterns of checkerboard, line, wave, dot, and known noise.

In another implementation, a non-transitory computer-readable storage medium storing a computer program to enable image capture is disclosed. The computer program includes executable instructions that cause a computer to: generate a pattern of light projection to be projected during non-video capture segments, wherein the pattern of light projection is not projected during video capture segments; determine timing of the non-video capture segments; project the generated pattern of light onto a capture volume during the non-video capture segments for a period less than a length of one non-video capture segment; capture image data of the projected pattern of light using at least one image sensor; and process the captured image data to obtain information about objects and people in the capture volume.

In one implementation, the information about the objects and people includes geometrical information of the objects and people. In one implementation, the information about the objects and people includes changes in positions of the at least one sensor based on distortions of the projected pattern of light.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the difference between the capture rate of an image sensor and the amount of image data needed for a target video rate can be significant. Thus, in some videos, this difference between the capture rate of image sensor and the amount of image data needed for a target video rate may be wasted.

Certain implementations of the present disclosure provide for apparatus and methods for using the time period available during the difference for additional information capture to enhance the quality of the videos. One implementation includes one or more programmable processors and corresponding computer system components to store and execute computer instructions, such as to provide synchronization of the projection of light with the image capture to do additional information capture.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, a technique is implemented for synchronizing projection of light with image capture of a capture volume. The technique uses gaps between the image capture for additional information capture using, for example, the projection of structured or patterned light. In one implementation, the primary image capture obtains the color, the texture, and the lighting of the objects and people in the capture volume, while the additional information capture obtains the geometry of the objects. In another implementation, the additional information capture determines information about the camera (or the image sensor), such as changes in camera position based on changes (or distortions) in the image data for the projected light.

Features provided in implementations can include, but are not limited to, one or more of the following items: a) Determine the difference between capture rate of image sensor and the amount of image data needed for target video rate; b) Use the difference to determine the additional space available for additional information capture (i.e., a secondary image capture); c) Determine a pattern of light projection using the additional space for the secondary image capture; d) Project light patterns onto objects in the capture volume; and e) Capture image data for video and secondary image capture.

Figure 1:
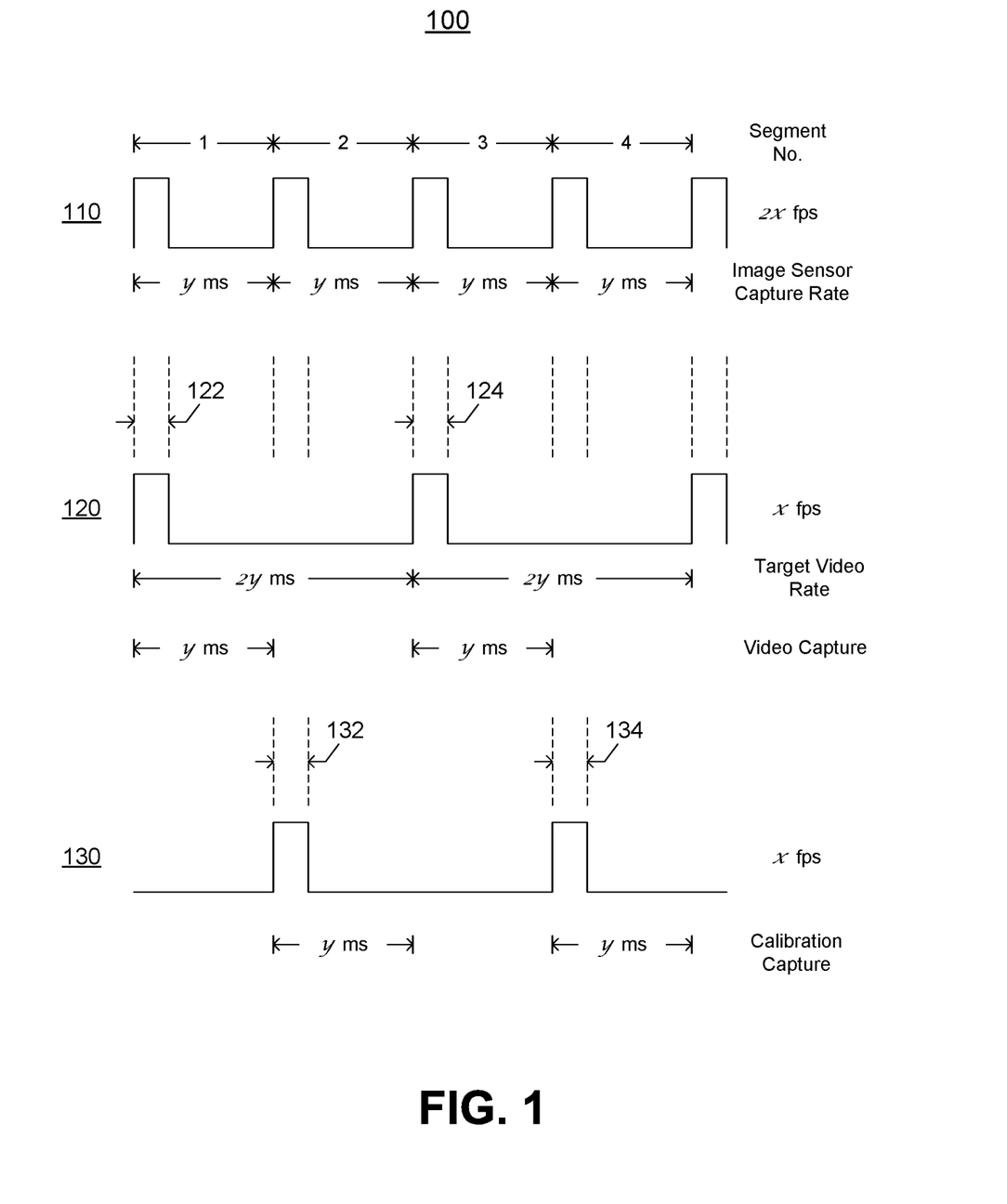
FIG. 1 shows timing diagrams of a capture system in accordance with one implementation of the present disclosure.

FIG. 1 shows timing diagrams 100 of an image capture system in accordance with one implementation of the present disclosure. In the illustrated implementation of FIG. 1, the image capture system uses a camera with an image sensor that can capture image data at $2x$ frames per second (fps). Timing diagram 110 shows the image sensor capture rate. The system also has a patterned or structured light source that can project light in patterns at a rate of $2x$ fps. The system may also have a primary light source for lighting objects or people for video capture. The system also includes a processor coupled to the camera and the light source to control their operation, as well as process, send and receive data. The system is configured to provide video data including image data at a rate of $x$ fps. That is, the target video rate of the system is $x$ fps. Timing diagram 120 shows the target video rate with the video capture 122, 124.

Because the target video rate is $x$ fps, the processor determines that there is an available space or time for a secondary image capture. Dividing one second into segments based on the capture rate of the image sensor, the processor determines that there are $2x$ available segments during one second, each segment lasting for $1/2x (= \frac{1}{y}$ ms) of a second. Thus, $x$ segments of the $2x$ total segments are needed for video image capture, leaving the remaining $x$ segments available for the secondary image capture (e.g., calibration capture). Timing diagram 130 shows the secondary image capture. Accordingly, timing diagrams 120, 130 show the video capture 122, 124 during Segment 1 (first $\frac{1}{y}$ ms) and Segment 3 (third $\frac{1}{y}$ ms), and the secondary capture 132, 134 during Segment 2 (second $\frac{1}{y}$ ms) and Segment 4 (fourth $\frac{1}{y}$ ms).

In one implementation, the processor generates or selects a pattern of light projection using the secondary image capture segments. Further, the processor is configured to project the pattern of light for a period less than the length of a capture segment ($\frac{1}{y}$ ms) during every other capture segment. For example, during capture segment 1 (from t=0 to t=$\frac{1}{y}$ ms), the pattern light source does not project light. During capture segment 2 (from t=$\frac{1}{y}$ ms to t=$\frac{2}{y}$ ms), the pattern light source projects light 132 (such as for ⅓ of the segment, from t=$3/3y$ ms to t=$4/3y$ ms or from t=$4/3y$ ms to t=$5/3y$ ms or from t=$5/3y$ ms to t=$6/3y$ ms). During capture segment 3, the pattern light source does not project light. During capture segment 4, the pattern light source projects light 134 again, and so on.

Figure 2:
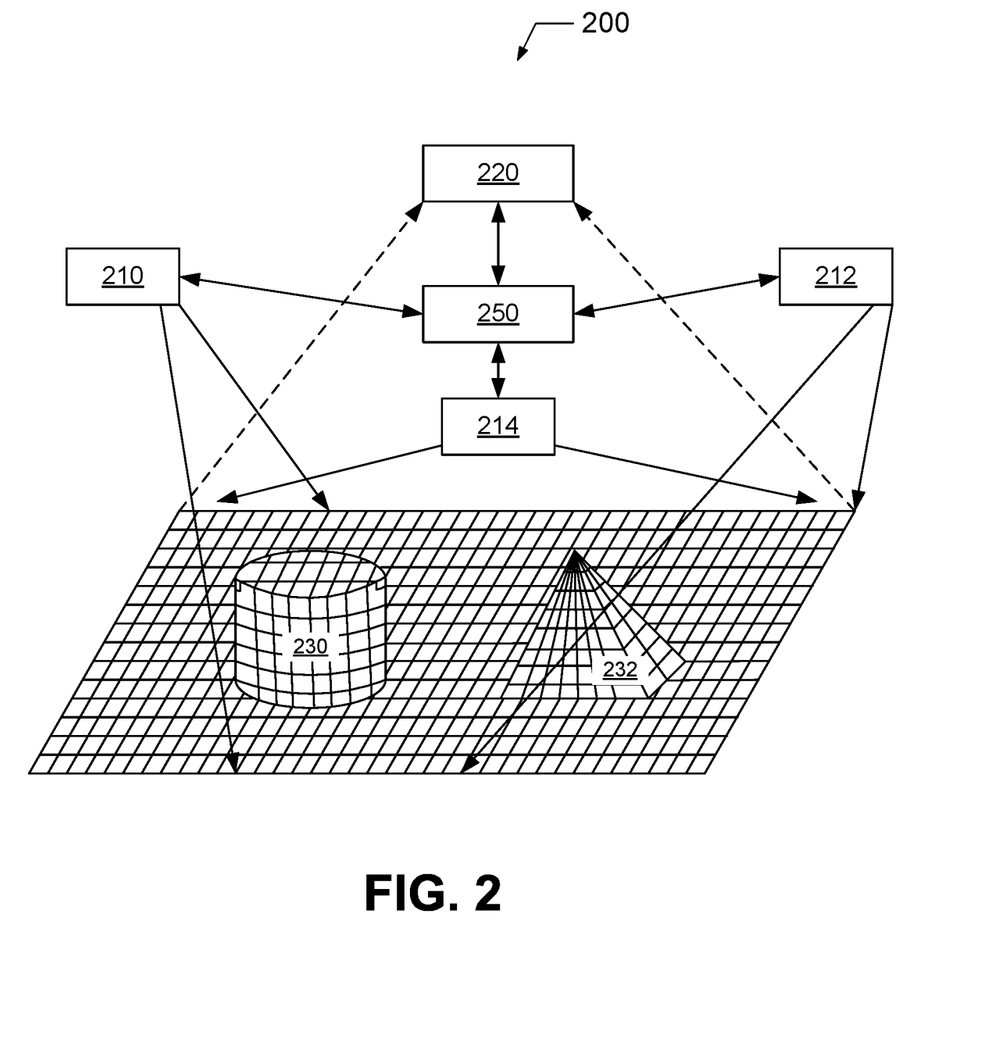
FIG. 2 is a block diagram of an image capture system in accordance with one implementation of the present disclosure.

FIG. 2 is a block diagram of an image capture system 200 in accordance with one implementation of the present disclosure. In the illustrated implementation of FIG. 2, the capture system 200 includes a plurality of light sources 210, 212, 214 and at least one image sensor 220. As described above, the plurality of light sources 210, 212, 214 can include primary light sources 214 for lighting objects or people for video capture and pattern light sources 210, 212 for the secondary capture. The system 200 also includes a processor 250 coupled to the sensor 220 and the light sources 210, 212, 214 to control their operation, as well as process, send, and receive data.

In one implementation, the pattern light sources 210, 212 are configured to project light using calibration light patterns, such as a checkerboard pattern shown in FIG. 2. The image sensor 220 captures image data of the projection of the checkerboard patterns onto the surfaces of objects 230, 232 (in the capture volume) for the secondary image capture. The processor uses the secondary image capture to determine information (e.g., geometry) about the objects 230, 232 onto which the checkerboard patterns were projected.

The processor 250 uses the secondary image capture to also determine information about the camera (including the image sensor 220), such as changes in camera position based on changes in the image data for the projected checkerboard patterns (e.g., changes in the distortion of the checkerboard patterns as the camera angle relative to the surface changes).

Figure 3:
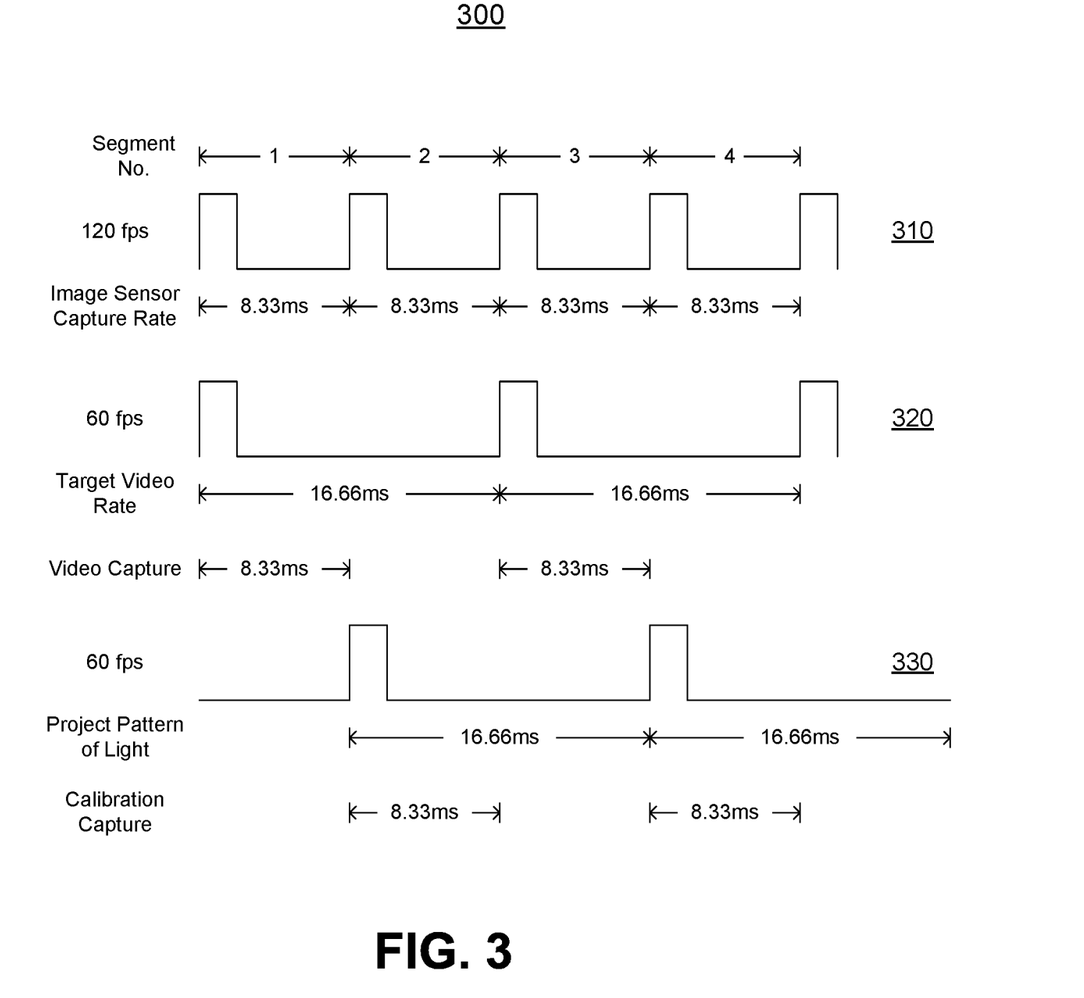
FIG. 3 shows timing diagrams of one example capture system in accordance with one implementation of the present disclosure.

FIG. 3 shows timing diagrams 300 of one example capture system in accordance with one implementation of the present disclosure. In FIG. 3, the system uses a camera with an image sensor that can capture image data at 120 fps (see 310). The system also has patterned or structured light sources that can project light in patterns at a rate of 60 fps (see 330). The system may also have a primary light source for lighting objects or people for video capture. As described above, the system is configured to provide the video data including image data at a rate of 60 fps (see 320).

In the example of FIG. 3, because the target video rate is 60 fps, the processor determines that there is available space or time for secondary image capture. Dividing one second into segments based on the capture rate of the image sensor, the processor determines there are 120 available segments during one second, each segment lasting for $\frac{1}{120}$ of a second. The 60 segments of the 120 segments are needed for video image capture (see timing diagram 320). The remaining 60 segments are available for the secondary capture (see timing diagram 330).

Figure 4:
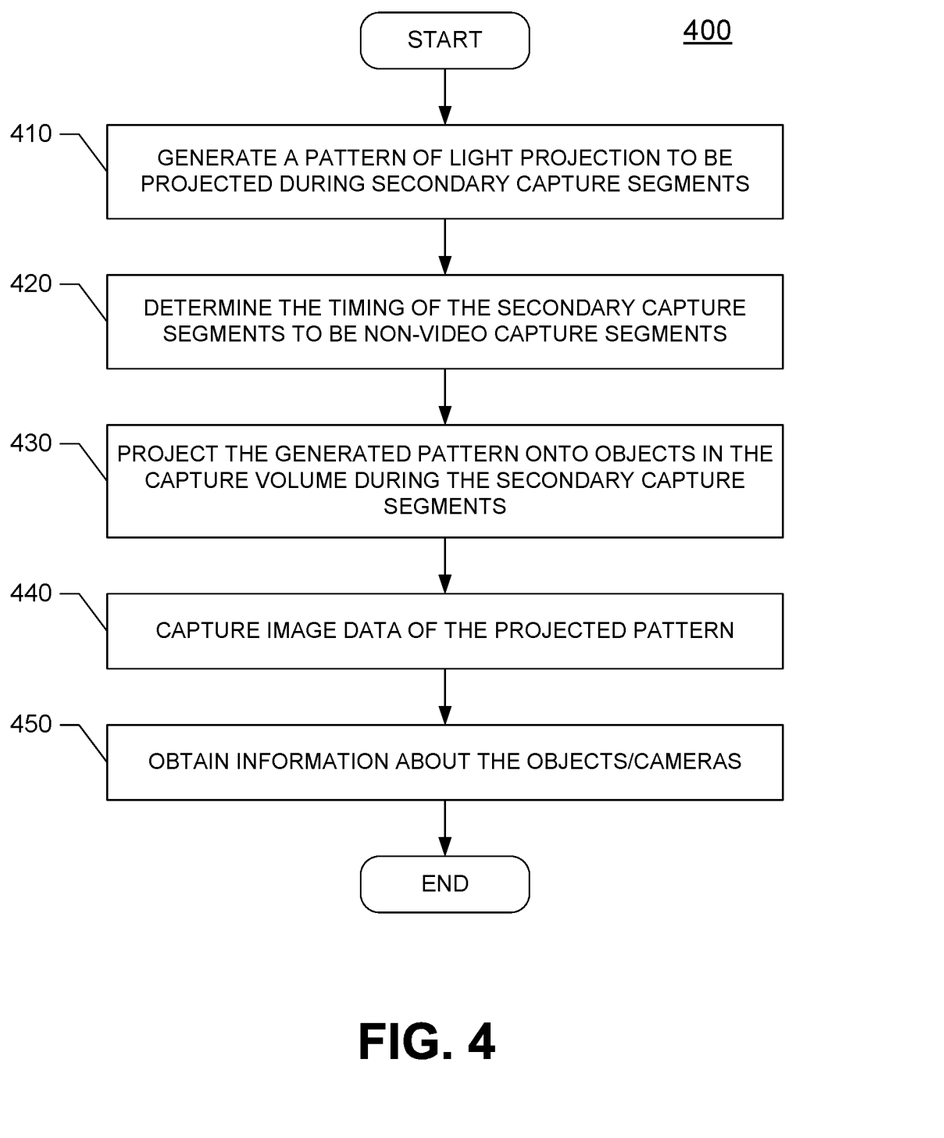
FIG. 4 is a flow diagram of a capturing process in accordance with one implementation of the present disclosure.

FIG. 4 is a flow diagram of a capturing process 400 in accordance with one implementation of the present disclosure. In the illustrated implementation of FIG. 4, a pattern of light projection is generated or selected, at block 410, to be projected during the secondary capture segments. The capture process 400 determines, at block 420, the timing of the secondary capture segments, which are non-video capture segments. The generated pattern is then projected onto the objects (and people) in the capture volume (e.g., objects 230, 232 in FIG. 2), at block 430, during the determined secondary capture segments for a period less than the length of the secondary capture segment ($= \frac{1}{120} ms$). In one implementation, the secondary capture segments are determined to be every other segment (e.g., even segments or odd segments). In another implementation, the secondary capture segments are determined to be randomly selected segments (e.g., segment 1, segment 4, segment 7, etc.).

In one implementation, the pattern light sources project light using a calibration light pattern, such as a checkerboard. At block 440, at least one image sensor captures image data of the projection of the checkerboard patterns onto the surfaces of the objects as the secondary image capture. In one implementation, the secondary image capture is processed, at block 450, to obtain information (e.g., geometry) about objects (in the capture volume) onto which the checkerboard patterns were projected. In another implementation, the secondary image capture is processed, at block 450, to obtain information about the cameras, such as changes in camera position based on changes in the image data for the projected checkerboard patterns (e.g., changes in the distortion of the checkerboard patterns as the camera angle relative to surface changes).

In a first implementation of the capture system, when the system starts the video capture, the image sensor captures image data at 120 fps, capturing 120 segments of image data each second. The processor (or camera) adds timestamp information to each block of image data. The timestamp indicates to which capture segment the image data corresponds. In one implementation, the image data captured during 60 of the capture segments are used for video image data, while the image data captured during the other 60 of the capture segments are used for secondary image data for geometry calculation and/or camera calibration. For example, during capture segment 1, the pattern light source does not project light, and the captured image data is for video image data. During capture segment 2, the pattern light source projects checkerboard patterns, and the captured image data is for geometry/calibration image data. This pattern repeats, resulting in 60 ordered frames of video image data and 60 ordered frames of calibration image data per second. The system uses the video image data to build and provide video data. In one implementation, the system uses the calibration image data to determine and adjust the 3-D geometry of objects in the video data. In another implementation, the system uses the calibration image data to determine and adjust the camera.

A second implementation of the capture system is similar to the first implementation, but it uses two forms of secondary image capture: one for capturing image data for geometry/calibration (similar to the first implementation); and another for capturing image data for motion capture. For motion capture, actors and objects have markers attached at various points. These markers are designed to be reflective and the reflected light can be captured by the image sensor as image data and that data can be used to indicate the locations of the markers as part of a motion capture process.

In the second implementation, the image sensor captures image data at 120 fps, but the target video rate is 24 fps, for example. Accordingly, the capture segments are each $\frac{1}{120}$ of a second. The system will use 24 of the capture segments for video image capture and the remaining 96 segments are available for the two types of secondary image capture. The processor generates or selects a pattern of light projection for the capture segments. With 96 segments available for secondary image capture, the processor sets 48 for motion capture and 48 for calibration capture. For example, capture segment 1 is for video image capture so the pattern light source does not project light. Capture segments 2 and 3 are for motion capture so the pattern light source projects light for motion capture during these segments. Capture segments 4 and 5 are for calibration capture so the pattern light source projects light for calibration capture during these segments. Capture segment 6 is for video capture again, and the pattern continues.

The pattern light source has two different patterns of projected light. For calibration capture, the pattern light source uses, for example, a checkerboard (similar to Example 1 shown above). For motion capture, the pattern light source uses, for example, an even projection (e.g., all white). The system uses the image data captured during the capture segments to build the video data (24 capture segments), build motion capture data (48 capture segments), and build calibration data (48 capture segments).

In an alternative implementation, various projection patterns can be used based on system or target factors, such as the capture rate of the image sensor, the target video rate, the rate of projection changes for the light source, the types of secondary image capture.

In another alternative implementation, various light patterns can be used for projection, including at least one of checkerboard, line, wave, dot, and known noise patterns. Different types of light images can be used also, such as colors, intensities, visible and non-visible light. Some segments may include periods of no light. Some segments may include periods where only the pattern light source(s) are the light sources (e.g., other light sources for video image capture are off).

In another alternative implementation, various projection patterns and lengths of capture segments can be used, generated, and selected, such as determined by the processor, determined by a user, predefined and selected. Some capture segments can be ignored, for example, by not capturing or discarding image data from those capture segments. In systems that are not producing video content to view as an end product, video data may only be used as reference video or video data may be omitted (e.g., all the capture segments are used for calibration and motion capture, or other secondary image capture purposes).

In another alternative implementation, the image data can be captured in the same way for two (or more) segments but the data can be used for different or multiple purposes. For example, image data is captured at 120 fps, and 60 frames are used for video image data (60 fps) and all 120 frames are used for camera calibration (e.g., based on changes in image data for fixed objects).

In another alternative implementation, multiple image sensors or types of images sensors can be used, including first image sensors for video image data and second image sensors for motion capture data using infrared light. Thus, the second image sensors include infrared sensors. Different image sensors may have different capture rates. In other implementations, multiple light sources or types of light sources can be used.

The above-described implementations are used in applications including camera systems for entertainment content, movies, television, or other applications such as personal games, security video, and medical imaging.

Figure 5A:
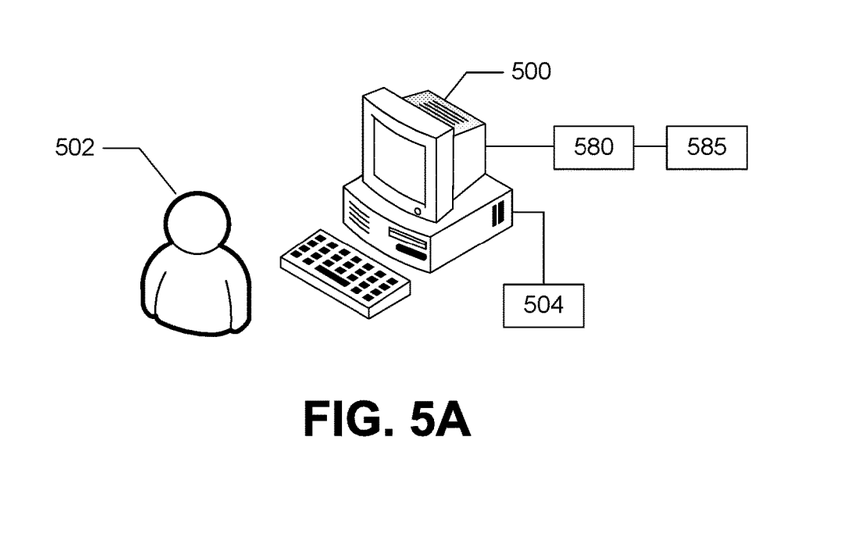
FIG. 5A is a representation of a capture system and a user in accordance with an implementation of the present disclosure.

FIG. 5A is a representation of a capture system 500 and a user 502 in accordance with an implementation of the present disclosure. The user 502 uses the computer system 500 to implement an image capture application 590 as illustrated and described with respect to the block diagram shown in FIG. 2 and the flow diagram shown in FIG. 4.

Figure 5B:
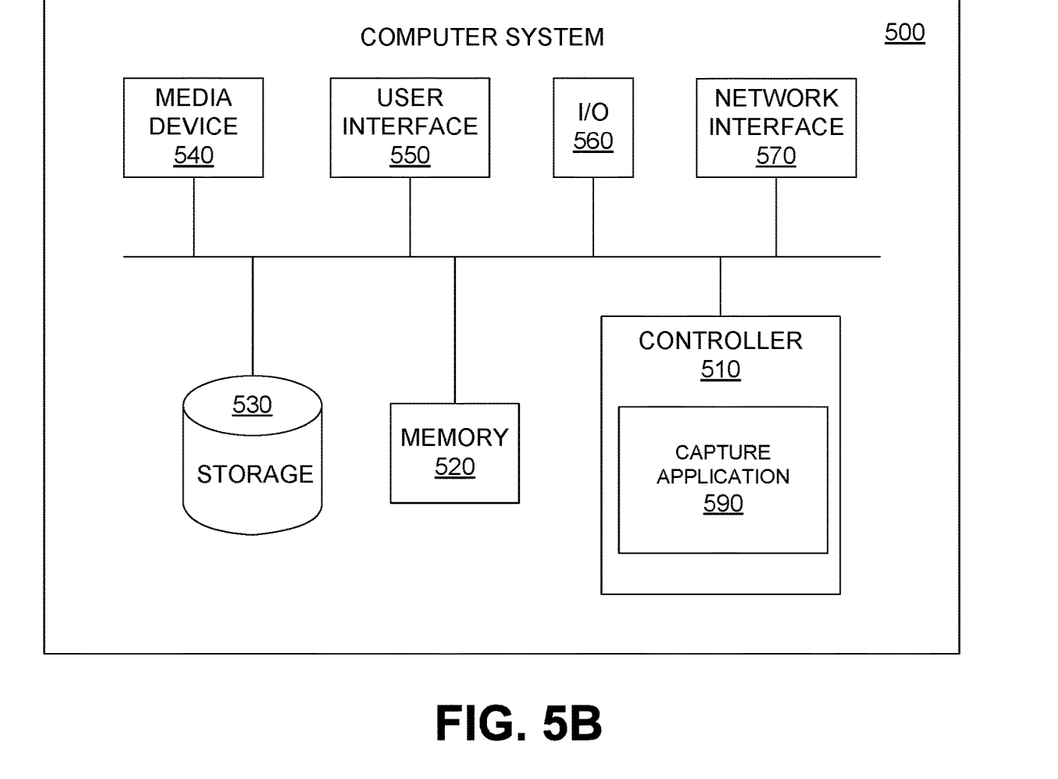
FIG. 5B is a functional block diagram illustrating the computer system hosting the capture application in accordance with an implementation of the present disclosure.

The computer system 500 stores and executes the image capture application 590 of FIG. 5B. In addition, the computer system 500 may be in communication with a software program 504. Software program 504 may include the software code for the image capture application. Software program 504 may be loaded on an external medium such as a CD, DVD, or a storage drive, as will be explained further below.

Furthermore, computer system 500 may be connected to a network 580. The network 580 can be connected in various different architectures, for example, client-server architecture, a Peer-to-Peer network architecture, or other type of architectures. For example, network 580 can be in communication with a server 585 that coordinates engines and data used within the image capture application. Also, the network can be different types of networks. For example, the network 580 can be the Internet, a Local Area Network or any variations of Local Area Network, a Wide Area Network, a Metropolitan Area Network, an Intranet or Extranet, or a wireless network.

FIG. 5B is a functional block diagram illustrating the computer system 500 hosting the capture application 590 in accordance with an implementation of the present disclosure. A controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the capture application 590 with a software system, such as to enable the creation and configuration of engines and data extractors within the capture application. Alternatively, this service can be implemented as separate hardware components in the controller 510 or the computer system 500.

Memory 520 stores data temporarily for use by the other components of the computer system 500. In one implementation, memory 520 is implemented as RAM. In one implementation, memory 520 also includes long-term or permanent memory, such as flash memory and/or ROM.

Storage 530 stores data either temporarily or for long periods of time for use by the other components of computer system 500. For example, storage 530 stores data used by the capture application 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user 502. In one implementation, the user interface 550 includes a keyboard, a mouse, audio speakers, and a display. The controller 510 uses input from the user 502 to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

The computer system 500 includes additional hardware and software typical of computer systems (e.g., power, cooling, operating system), though these components are not specifically shown in FIG. 5B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. For example, although the description refers to projecting patterns onto objects and people, the patterns can be projected onto other elements including animals or other living beings. It is further understood that the scope of the present disclosure fully encompasses other implementations that may become obvious to those skilled in the art and that the scope of the present disclosure is accordingly limited by nothing other than the appended claims.

The invention claimed is:

1. An image capture system, comprising:
a plurality of light sources of a same type configured to illuminate a capture volume starting at a first start time for at least one of video capture and non-video capture,
wherein a type of light sources includes a visible light source and an infrared light source,
wherein the non-video ca tune includes at least one of: a geometric capture to enable determination of one of geometrical information of objects and people in the capture volume; a calibration capture to enable calibration of the at least one image sensor; and a motion capture;
at least one image sensor, including at least one visible light sensor and at least one infrared sensor, configured to capture image data; and
a processor coupled to and configured to control operation including timing of the at least one image sensor and the plurality of light sources,
wherein the plurality of light sources includes a plurality of primary light sources to illuminate the capture volume during segments of the video capture, which occur at a fixed time interval starting from the first start time,
wherein the plurality of light sources includes a plurality of pattern light sources configured to illuminate the capture volume with patterns during segments of the non-video capture, which occur at the fixed time interval starting from a second start time,
wherein the second start time is between the first start time and the first start time plus the fixed time interval during which the plurality of primary light sources is not illuminating the capture volume.

2. The system of claim 1, wherein the plurality of light sources which illuminates during segments of the video capture is configured to enable determination of at least one of color, texture, and lighting of objects and people in the capture volume.

3. The system of claim 1, wherein the calibration capture enables determination of information about the at least one image sensor including changes in positions of the at least one image sensor based on distortions of the patterns.

4. The system of claim 1, wherein the patterns illuminated by the plurality of pattern light sources comprise at least one of patterns of checkerboard, line, wave, dot, and known noise.

5. The system of claim 1, wherein the image data captured during the segments of the video capture is discarded or used as reference video, and only the image data captured during the segments of the non-video capture is used.

6. The system of claim 1, wherein the image data captured during the segments of the video capture is discarded, and only the image data captured during the segments of the non-video capture is used.

7. The system of claim 1, wherein the image data captured during the segments of the video capture is used as reference video for the image data captured during the segments of the non-video capture.

8. The system of claim 1, wherein the plurality of light sources which illuminates during the segments of the video capture and the non-video capture is configured to enable determination of information about the at least one image sensor including changes in positions of the at least one image sensor based on distortions of the patterns.

9. The system of claim 1, wherein the at least one infrared sensor is used for motion capture.

10. The system of claim 1, wherein the at least one image sensor comprises
at least one camera system used for one of: entertainment content, movies, television, personal games, security video, or medical imaging.

11. An image capturing method, comprising:
generating a pattern of visible light to be projected during non-video capture segments using a plurality of visible light sources,
wherein the pattern of visible light is not projected during video capture segments, wherein the plurality of visible light sources is used to project non-patterned visible light during the video capture segment;

determining timing of the non-video capture segments;

projecting the generated pattern of visible light onto a capture volume during the non-video capture segments for a period less than a length of one non-video capture segment;

capturing first image data of the projected pattern of visible light during the non-video capture segments using at least one image sensor;

capturing second image data during the video capture segments using the at least one image sensor;

processing the captured first image data to obtain information about objects and people in the capture volume, to enable calibration of the at least one image sensor, and to perform, motion capture; and processing the captured second image data to capture video.

12. The method of claim 11, wherein the information about the objects and people comprises geometrical information of the objects and people.

13. The method of claim 11, wherein the information about the objects and people comprises changes in positions of the at least one image sensor based on distortions of the projected pattern of light.

14. The method of claim 11, wherein the pattern of light projection comprises at least one of patterns of checkerboard, line, wave, dot, and known noise.

15. A non-transitory computer-readable storage medium storing a computer program to enable image capture, the computer program comprising executable instructions that cause a computer to:

generate a pattern of visible light to be projected during non-video capture segments using a plurality of visible light sources, wherein the pattern of visible light is not projected during video capture segments, wherein the plurality of visible light sources is used to project non-patterned visible fight during the video capture segment;

determine timing of the non-video capture segments;

project the generated pattern of visible light onto a capture volume during the non-video capture segments for a period less than a length of one non-video capture segment;

capture first image data of the projected pattern of visible light during the non-video capture segments using at least one image sensor;

capture second image data during the video capture segments using the at least one image sensor;

process the captured first image data to obtain information about objects and people in the capture volume, to enable calibration of the at least one image sensor, and to perform motion capture; and process the captured second image data to capture video.

16. The non-transitory computer-readable storage medium of claim 15, wherein the information about the objects and people comprises geometrical information of the objects and people.

17. The non-transitory computer-readable storage medium of claim 15, wherein the information about the objects and people comprises changes in positions of the at least one image sensor based on distortions of the projected pattern of light.

* * * * *